United States Patent [19]
Ruthel et al.

[11] Patent Number: 5,108,722
[45] Date of Patent: Apr. 28, 1992

[54] SULFATE REMOVAL FROM CHLORATE LIQUOR

[75] Inventors: Walter W. Ruthel; Tilak V. Bommaraju, both of Grand Island, N.Y.

[73] Assignee: Occidental Chemical Corporation, Niagara Falls, N.Y.

[21] Appl. No.: 572,828

[22] Filed: Aug. 27, 1990

[51] Int. Cl.$^5$ .......................... C01D 3/14; C01B 11/12
[52] U.S. Cl. ...................... 423/179; 423/499; 423/475; 423/659; 204/95; 23/302 T
[58] Field of Search .................. 204/95; 423/499, 179, 423/463, 475, 659; 23/302 T

[56] References Cited
U.S. PATENT DOCUMENTS
4,702,805  10/1987  Burkell et al. ...................... 204/95

OTHER PUBLICATIONS

Seidell, "Solubilities Inorganic and Metal-Organic Compounds," 4th Ed., vol. 2, 1958, p. 985.
Occidental Chemical Corporation, Chlorates brochure, "Hooker Sodium Chlorate Product Information Manual," 1977, p. 36.
Perry et al., *Chemical Engineer's Handbook*, Fifth Edition, McGraw Hill Book Co., 1973, pp. 17-18 thru 17-11.
*In re McCarthy et al.*, 846F2.d77, Mar. 8, 1988.

*Primary Examiner*—John Niebling
*Assistant Examiner*—Kathryn Gorgos
*Attorney, Agent, or Firm*—James F. Tao; Richard D. Fuerle

[57] ABSTRACT

Disclosed is a method of removing sulfate ion from an aqueous sodium chlorate liquor. A crystallization temperature is selected between about −15° and about 0° C. and the maximum concentration of sodium chlorate that is soluble in the liquor at that temperature is determined. The liquor is diluted so that the concentration of sodium chlorate in the liquor is less than that maximum concentration and the liquor is cooled to that temperature so that the sulfate ion in the liquor crystallizes as sodium sulfate decahydrate but the sodium chlorate does not crystallize.

8 Claims, 1 Drawing Sheet

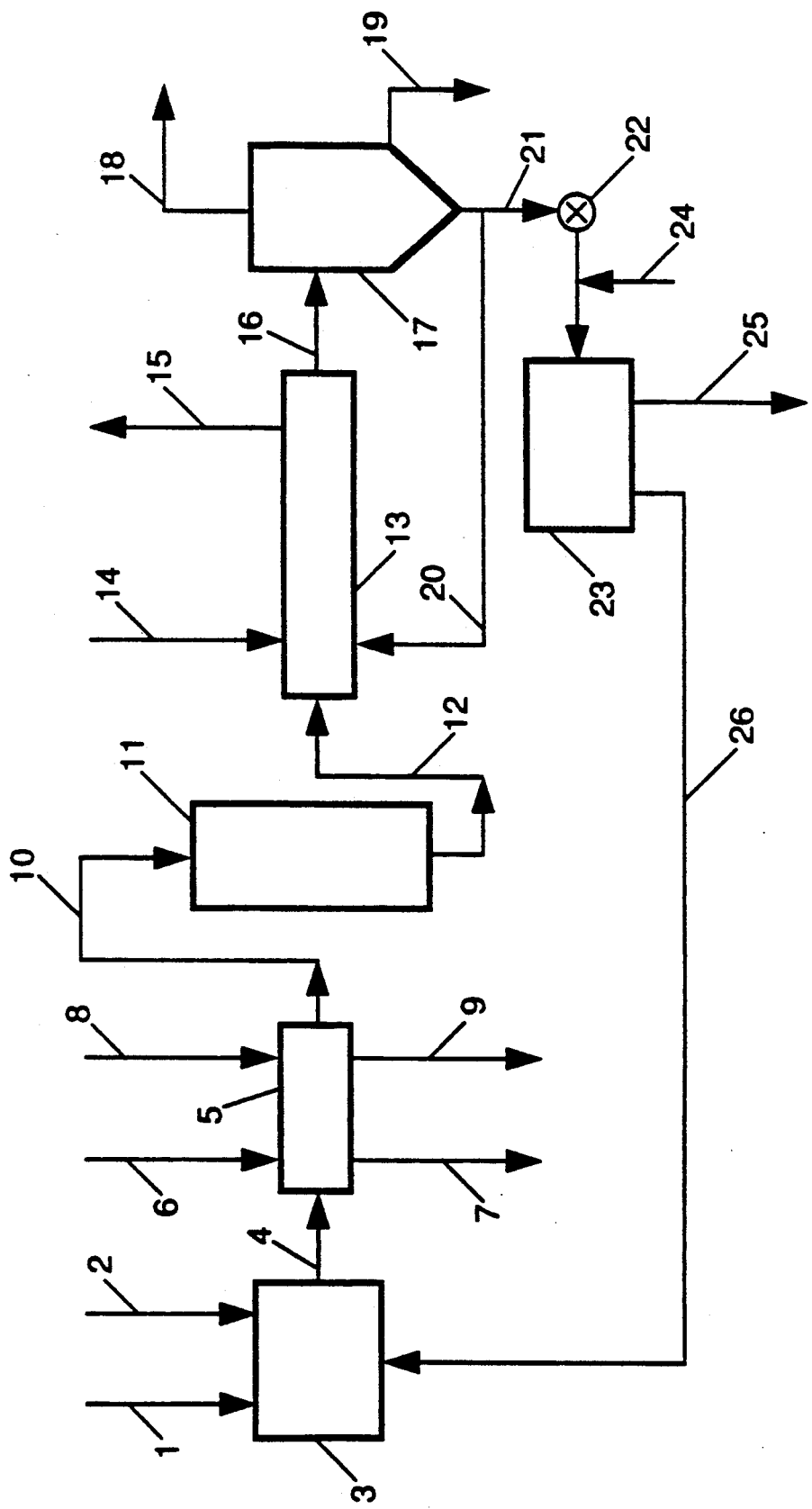

SULFATE REMOVAL FROM CHLORATE LIQUOR

BACKGROUND OF THE INVENTION

This invention relates to the removal of the sulfate ion from an aqueous sodium chlorate liquor. Specifically, it relates to diluting the liquor with water prior to cooling it to a temperature at which sodium sulfate decahydrate crystallizes but sodium chlorate does not crystallize.

Sodium chlorate can be prepared by the electrolysis of a sodium chloride brine. If the brine contains sulfate ion, the solid sodium chlorate product can also contain sulfate, as sodium sulfate. While for some uses the presence of sodium sulfate in the sodium chlorate is not objectionable, there are other applications where the presence of sulfate is not acceptable.

In U.S. Pat. No. 4,702,805 there is described a method of removing sodium sulfate from a chlorate liquor. In the method described in that patent, a portion of the chlorate liquor is cooled to 5° C. or lower to crystallize the sodium sulfate. However, at that temperature, a significant amount of sodium chlorate also crystallizes. The sodium chlorate that is crystallized with the sodium sulfate can either be discarded and lost, dried and added to the product sodium chlorate, or the cocrystallized products can be redissolved and treated with a soluble calcium or barium salt, such as calcium or barium chloride, to crystallize calcium or barium sulfate. The method of that patent therefore requires both a physical and a chemical crystallization to separate the sulfate from the chlorate.

SUMMARY OF THE INVENTION

We have discovered that sulfate ions can be separated from a sodium chlorate liquor solely by a physical crystallization. We have found that if the liquor is diluted to a concentration at which the sodium chlorate in the liquor is soluble at the crystallization temperature, the sodium chlorate will not crystallize but the sodium sulfate will still crystallize. In this way, we are able to remove the sulfate ion from the chlorate liquor without the use of chemical precipitation, such as the addition of calcium or barium to the liquor. Although additional water is added to the liquor, it is not necessary to evaporate any additional water because the diluted sodium chlorate liquor can be used to dissolve the sodium chloride and form the brine from which the liquor is prepared.

BRIEF DESCRIPTION OF THE DRAWING

FIG. 1 is a diagrammatic view illustrating a certain presently preferred embodiment of this invention.

BRIEF DESCRIPTION OF THE PREFERRED EMBODIMENTS

In the drawing, water in line 1 and sodium chloride containing sulfate as an impurity in line 2 are added to a dissolver 3 to form a brine which is passed through line 4 to chemical purifier 5. Sodium carbonate in line 6 is added to chemical purifier 5 to precipitate calcium carbonate, which is removed through line 7, and sodium hydroxide in line 8 is added to precipitate magnesium hydroxide, which is removed through line 9, thereby removing the bulk of the calcium and magnesium ions from the liquor. The removal of these ions is necessary because they increase the cell voltage. The brine passes through line 10 to ion exchange bed 11 where any traces of calcium and magnesium are removed from the liquor by passing it through an ion exchange resin. The liquor then passes through line 12 to electrolytic cell 13. An acid is added to the cell through line 14 and hydrogen is removed through line 15. In the cell, the following overall reaction occurs, changing some of the sodium chloride into sodium chlorate:

$$NaCl + 3H_2O \rightarrow NaClO_3 + 3H_2$$

The resulting sodium chlorate liquor then passes through line 16 to crystallizer 17 where water is evaporated and passes out through line 18 and crystallized sodium chlorate crystals leave through line 19. Crystallizer 17 is typically operated at a temperature of about 30° to about 50° C. Most of the remaining mother liquor (a solution saturated with sodium chlorate at a concentration of about 520 grams per liter at 30° C., and about 650 grams per liter at 50° C., which also contains sodium chloride and sodium sulfate) is recycled through line 20 back to electrolytic cell 13. A portion of the mother liquor in line 20 can be diverted through line 21 by valve 22 into secondary crystallizer 23. Water in line 24 is added to the mother liquor to dilute it so that sodium chlorate does not crystallize in secondary crystallizer 23. The solubility of sodium chlorate in the liquor at the selected crystallization temperature can be determined experimentally by cooling various dilutions of the liquor to that temperature. In secondary crystallizer 23, the liquor is cooled to a temperature between about $-15°$ C. and about 0° C. to crystallize sodium sulfate as sodium sulfate decahydrate which leaves through line 25. The crystallization temperature is preferably between about $-12°$ and about $-8°$ C. because below about $-12°$ ice crystals or double salts may start to form, and above about $-8°$ less sodium sulfate crystallizes. The sodium sulfate in line 25 can be separated from the diluted mother liquor by means such as, for example, centrifugation or filtration, and the sodium sulfate decahydrate crystals can be washed to recover any remaining mother liquor. The remaining diluted mother liquor can be passed through line 26 back to dissolver 3.

The following examples further illustrate this invention.

EXAMPLE 1

A sodium chlorate mother liquor containing sodium chloride, sodium sulfate, sodium chlorate, sodium bichromate, and sodium hydroxide was diluted with 471.4 g. of water per liter of mother liquor then cooled to $-10°$ C. The following table gives the initial composition of the mother liquor (Initial ML), the composition of the mother liquor after dilution with the water (Diluted ML), the amount of sodium sulfate decahydrate removed from the mother liquor by crystallization, and the final composition of the mother liquor (Final ML).

|  | Initial ML wt % | Initial ML GPL | Diluted ML wt % | Diluted ML Gms. | $Na_2SO_4 \cdot 10H_2O$ Removed Gms. | Final ML wt % |
|---|---|---|---|---|---|---|
| $H_2O$ | 51.42 | 730.1 | 61.74 | 1101.5 | 15.5 | 61.58 |
| $NaClO_3$ | 36.58 | 519.5 | 29.00 | 519.5 |  | 29.46 |
| NaCl | 10.00 | 142.0 | 7.93 | 142.0 |  | 8.05 |
| $Na_2SO_4$ | 1.57 | 22.3 | .99 | 22.3 | 12.2 | .57 |
| $Na_2Cr_2O_7$ | .39 | 5.5 | .31 | 5.5 |  | .31 |

-continued

|  | Initial ML wt % | Initial ML GPL | Diluted ML wt % | Diluted ML Gms. | Na₂SO₄· 10H₂O Removed Gms. | Final ML wt % |
|---|---|---|---|---|---|---|
| NaOH | .04 | .6 | .03 | .6 |  | .03 |
| Total | 100.00 | 1420.0 | 100.00 | 1791.4 | 27.7 | 100.00 |

The above table shows that sodium sulfate was removed from the mother liquor but that the sodium chlorate did not crystallize with the sodium sulfate.

EXAMPLE 2

To 1 l of a mother liquor containing 36.6 wt % sodium chlorate, 10 wt % sodium chloride, 1.7 wt % sodium sulfate, and amount of water was determined from previously developed sodium chloride/sodium chlorate saturation data (see "Hooker Sodium Chlorate Product Information Manual," 1977, page 36) to maintain the same NaCl/NaClO₃ ratio at −10° C. as at the mother liquor temperature in order to prevent the crystallization of sodium chlorate at −10° C. The solution was then cooled to −10° C., and the crystals that formed were collected and dried. 10 g. of the crystals were diluted to 100 cc. of solution and were analyzed. The 10 g of crystal were found to contain 1.9% sodium chromate, 65.0% sodium sulfate, 6.4% sodium chloride, and 26.7% sodium chlorate.

Two further experiments were then performed to determine if the addition of more water would decrease the amount of sodium chlorate that crystallized. The following table gives the amount of water added to 1 l of mother liquor, the sodium sulfate concentration in the mother liquor before crystallization and after crystallization, and the percent of sodium sulfate removed.

| Water Added to 1 liter Mother Liquor (l) | Na₂SO₄ Conc. in Liquor Before Crystallization (g/l) | Na₂SO₄ Conc. in Liquor After Crystallization (g/l) | Na₂SO₄ Removed (%) |
|---|---|---|---|
| 0.371 | 16.3 | 4.0 | 75 |
| 0.428 | 15.6 | 6.9 | 56 |
| 0.504 | 14.8 | 5.3 | 64 |

The above table shows that most of the sodium sulfate was removed from the mother liquor. The crystals were then analyzed. The following table gives the analysis of the crystals.

| Water Added to 1 l Mother Liquor (l) | NaClO₃ (g) | NaCl (g) | Na₂SO₄ (g) | Na₂Cr₂O₇ (g) |
|---|---|---|---|---|
| 0.371 | 2.6 | 0.6 | 6.3 | 0.2 |
| 0.428 | 2.8 | 1.2 | 5.8 | 0.2 |
| 0.504 | 2.3 | 1.0 | 6.5 | 0.2 |

The above table shows that very little sodium chlorate crystallized with the sodium sulfate. Because sodium chloride is soluble at the crystallization temperature in the concentrations that were present in the mother liquor, the presence of sodium chloride in the crystals indicates that the crystals were not adequately washed. Adequate washing would also lower the amount of sodium chlorate present on the crystals.

We claim:

1. In a method of removing sulfate from an aqueous chlorate liquor where said liquor is cooled to a temperature at which, a sulfate compound crystallizes, the improvement which comprises diluting said liquor with an amount of water sufficient to prevent the crystallization of a chlorate compound at said temperature prior to cooling said liquor to said temperature.

2. An improvement according to claim 1 wherein said temperature is about −15° to about 0° C.

3. An improvement according to claim 2 wherein said temperature is about −12° to about −8° C.

4. An improvement according to claim 1 wherein said chlorate liquor is a sodium chlorate liquor, said chlorate compound is sodium chlorate, and said sulfate compound is sodium sulfate decahydrate.

5. A method of removing sulfate ion from an aqueous sodium chlorate liquor comprising
   (A) selecting a crystallization temperature between about −15° and about 0° C.;
   (B) determining the maximum concentration of sodium chlorate that is soluble in said liquor at said temperature;
   (C) diluting said liquor so that the concentration of sodium chlorate therein is less than said maximum concentration; and
   (D) cooling said liquor to said temperature, whereby sodium sulfate decahydrate is crystallized, but sodium chlorate is not crystallized.

6. A method according to claim 5 wherein said temperature is between about −12° and about −8° C.

7. In a method of making sodium chlorate wherein sodium chloride contaminated with sulfate is dissolved in water to make a brine that is electrolyzed to make a sodium chlorate liquor containing sulfate ion, a method of reducing the sulfate ion concentration in said liquor comprising
   (A) diluting at least a portion of said liquor with water so that the concentration of sodium chlorate in said liquor is less than its solubility limit at a selected temperature between about −15° and about 0° C.;
   (B) cooling said portion of said liquor to said selected temperature, whereby sodium sulfate crystallizes, but sodium chlorate does not crystallize;
   (C) separating said crystallized sodium sulfate from said liquor; and
   (D) recycling said liquor to dissolve said sodium chloride and form said brine.

8. A method according to claim 7 wherein said temperature is about −12° to about −8° C.

* * * * *